United States Patent
Noestheden

[19]

[11] Patent Number: 5,160,605
[45] Date of Patent: Nov. 3, 1992

[54] DEVICE FOR SEPARATING HYDROCARBON PRODUCTS FROM WATER WITH VENTURI JET PUMP

[75] Inventor: Andrew Noestheden, Tecumseh, Canada

[73] Assignee: Valiant Machine & Tool Inc., Windsor, Canada

[21] Appl. No.: 682,935

[22] Filed: Apr. 10, 1991

[51] Int. Cl.$^5$ .................... B01D 17/12; B01D 17/025
[52] U.S. Cl. .................... 210/97; 210/122; 210/171; 210/242.3; 210/257.1; 210/258; 210/513; 417/151
[58] Field of Search .................. 210/121, 242.1, 242.3, 210/248, 257.1, 258, 776, 255, 97, 168, 171, 172, 416.5, 513, 122; 417/61, 151

[56] References Cited

U.S. PATENT DOCUMENTS

| | | | |
|---|---|---|---|
| 237,796 | 2/1881 | Alexander | 210/257.1 |
| 536,858 | 2/1895 | Donato | 210/242.1 |
| 2,730,240 | 1/1956 | Johnson | 210/258 |
| 3,944,489 | 3/1976 | Derzhavets et al. | 210/776 |
| 4,361,488 | 11/1982 | White et al. | 210/168 |
| 4,693,822 | 9/1987 | Bowe et al. | 210/255 |
| 4,913,814 | 4/1990 | Singh et al. | 210/258 |
| 5,059,312 | 10/1991 | Galletti | 210/242.3 |

Primary Examiner—Robert A. Dawson
Assistant Examiner—Joseph Drodge
Attorney, Agent, or Firm—Gifford, Groh, Sprinkle, Patmore and Anderson

[57] ABSTRACT

A device is disclosed for separating hydrocarbon products such as cutting oil from water. The device includes a receiving tank defining a reservoir which receives a mixture of water and oil. The oil floats above the water and thus forms an upper layer in the receiving tank. A skimmer skims the upper layer from the receiving tank and channels the skimmed portion to a pumping chamber. A venturi jet pump then pumps the skimmed portion from the pumping chamber to a settling tank which then separates the oil and water. The skimmer includes floats which vary the depth of the skimmer as a function of the liquid level in the receiving tank.

15 Claims, 2 Drawing Sheets

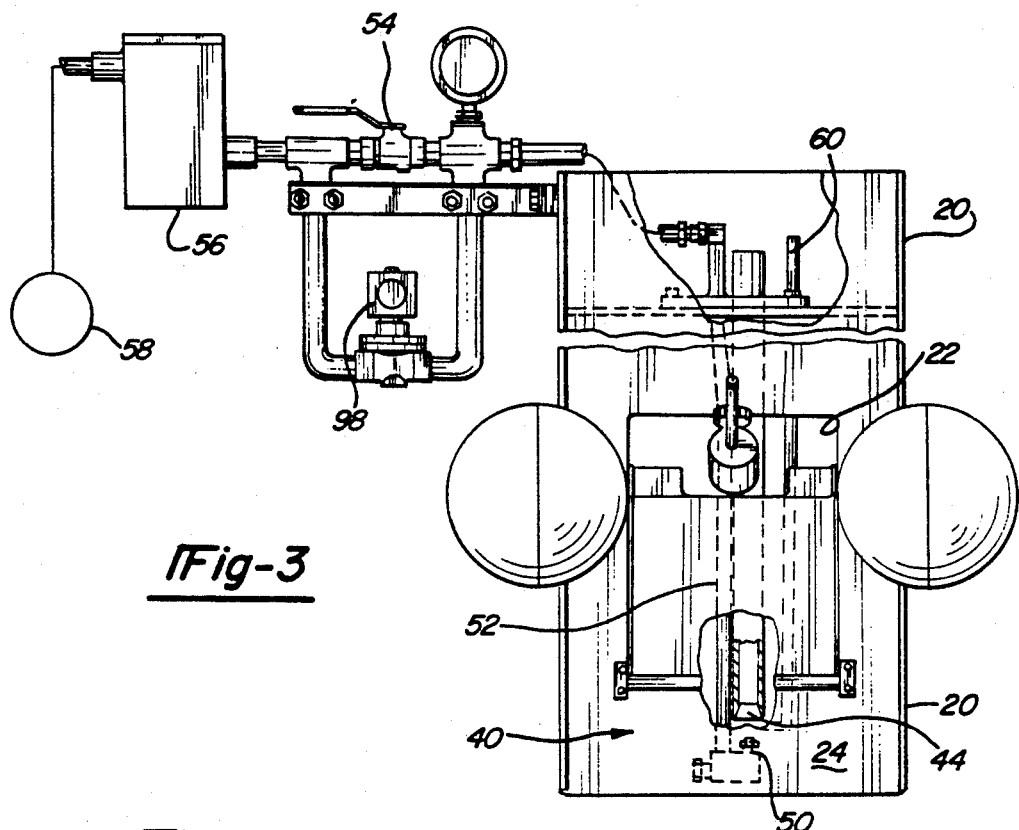
Fig-3
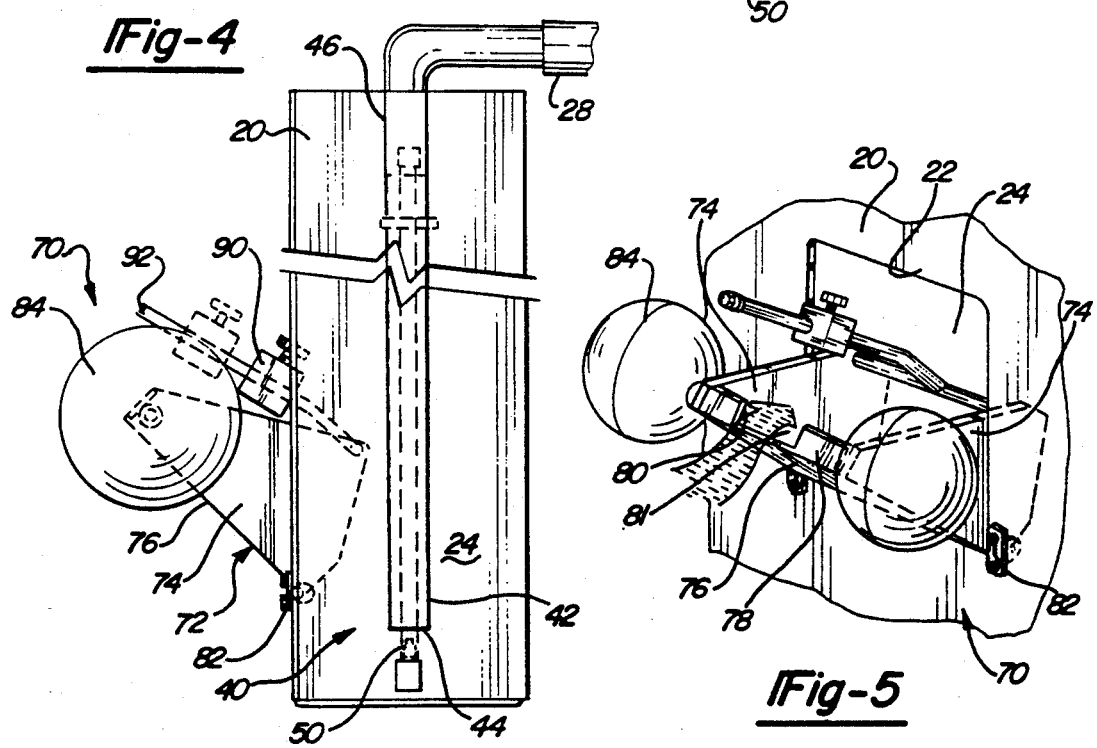
Fig-4
Fig-5

DEVICE FOR SEPARATING HYDROCARBON PRODUCTS FROM WATER WITH VENTURI JET PUMP

BACKGROUND OF THE INVENTION

1. Field of the Invention

The present invention relates to a device for separating hydrocarbon products, such as oil, from water.

2. Description of the Prior Art

There are many situations in which hydrocarbon products, hereafter called oils, become mixed with water. As is well known, the oil floats to the top of the water due to its lower density.

One industrial application in which the oils must be separated from water occurs for an industrial washer. In such a washer, water is sprayed on machined parts which oftentimes contain cutting oils and the like from various machining operations. In such industrial washers, typically numerous water jets spray water against the part thus removing any oil and dirt contained on the part.

Thereafter, the water and oil mixture is collected within a reservoir. A pump then pumps the water and oil mixture from the reservoir to an elevated settling tank in which the oil is allowed to separate from the water. The separated oil is then drained from the water and disposed of in any conventional fashion while the water itself is recycled to the industrial washer.

The previously known systems for separating oils from water in industrial washers, however, suffer from a number of disadvantages. One such disadvantage is that the pump which pumps the water and oil mix from the reservoir to the settling tank is typically a piston pump. Such piston pumps are not only bulky and expensive, but are also prone to failure and require frequent maintenance. Furthermore, the oils, debris and the like which passes through the pump can damage, clog or otherwise interfere with the operation of the pump.

A still further disadvantage of these previously known systems for separating oils from water for an industrial washer is that the level of the water and oil mix in the reservoir will vary throughout the operation of the industrial washer. The pump for the separator then pumps all of the liquid in the reservoir to the settling tank. As such, only a dilute mixture of oil is pumped from the reservoir to the settling tank. Consequently, the settling tanks for these previously known industrial washers are necessarily large and thus expensive in order to accommodate and satisfactorily separate the rather dilute mixture of oil and water in the settling tank.

SUMMARY OF THE PRESENT INVENTION

The present invention provides a device which overcomes all of the above mentioned disadvantages of the previously known devices.

In brief, the device of the present invention comprises a receiving tank which defines a reservoir. This reservoir receives the mixture of water and oil from any suitable source, such as an industrial washer. Since the oils are less dense than the water, the oils tend to float to the surface of the mixture in the receiving tank.

The device further includes a means for skimming the upper oil rich layer in the receiving tank and channelling the skimmed portion from the receiving tank to a pumping chamber. Since only the upper oil rich layer is skimmed from the receiving tank, the skimmed portion is necessarily highly concentrated with oils and other hydrocarbon products.

A venturi pump is then used to pump the skimmed portion of the mixture in the pumping chamber through a vertically extending tube and to an elevated settling tank. Since the mixture introduced into the settling tank is highly concentrated with hydrocarbon products, only a relatively small sized settling tank is necessary to effectively and efficiently separate the oils from the water. The oils are then removed and disposed of in any appropriate fashion while the now clean water can be recycled, such as for use in the industrial washer.

In the preferred form of the invention, the skimmer preferably includes a weir having a channel section which forms a sluice through which the upper layer from the receiving tank can flow into the pumping chamber. The weir is preferably pivotally mounted to either the reservoir or a pump housing so that depth of the channel section in the reservoir can vary as the weir pivots. Furthermore, a pair of floats attached to the weir allow the vertical height of the weir, and thus the depth of the channel section, to vary in accordance with the liquid level in the reservoir. Consequently, the vertical depth of the skimmed portion remains substantially constant despite changes in the water level in the reservoir.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 3 is a front view illustrating a preferred embodiment of the invention;

FIG. 4 is a fragmentary side view illustrating a portion of the preferred embodiment of the present invention; and FIG. 5 is a perspective view illustrating a portion of the preferred embodiment of the present invention.

DETAILED DESCRIPTION OF A PREFERRED EMBODIMENT OF THE PRESENT INVENTION

Figure 1:
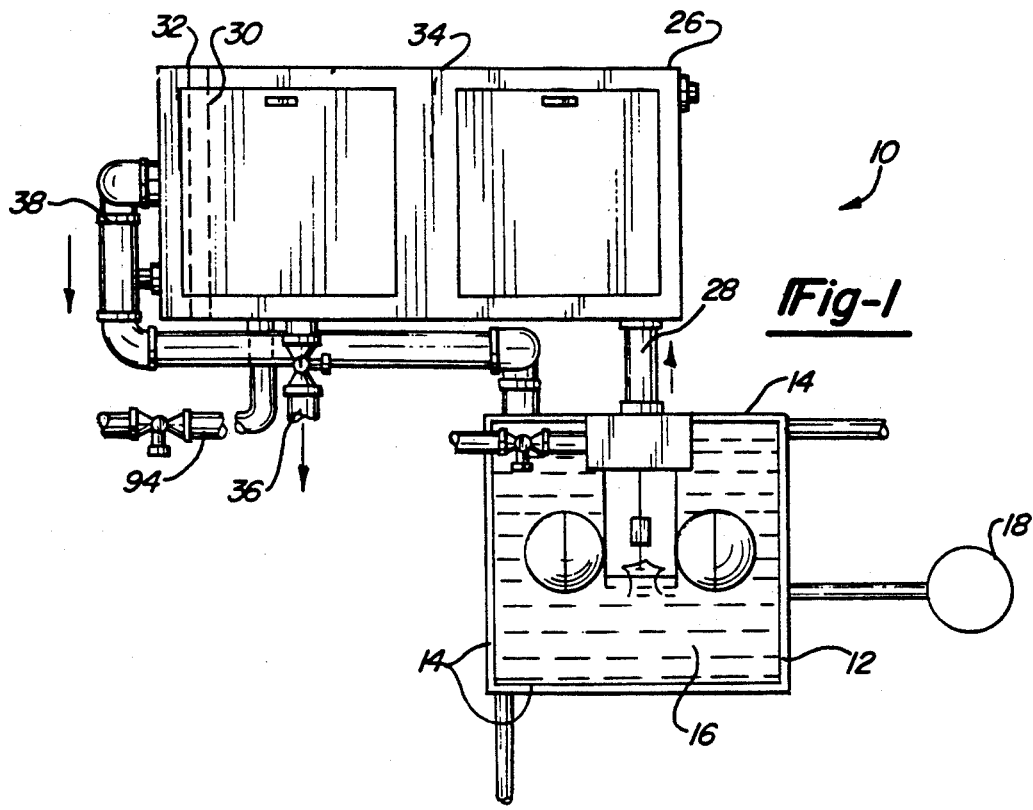
FIG. 1 is a top plan view illustrating a preferred embodiment of the present invention.
Figure 2:
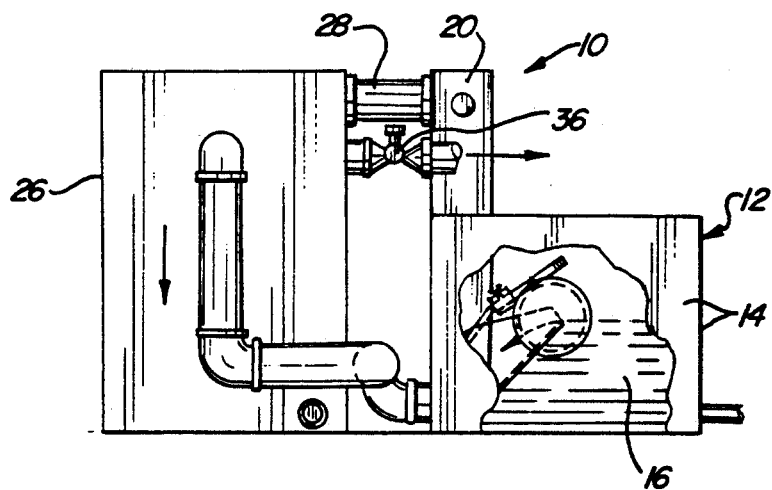
FIG. 2 is a left side view illustrating the preferred embodiment of the invention.

With reference first to FIGS. 1 and 2, a preferred embodiment of the device 10 of the present invention for separating hydrocarbon products (hereinafter collectively referred to as oils) from water is thereshown. The device 10 comprises a generally rectangular receiving tank 12 having four sides 14 which together form a reservoir 16. The reservoir 16 receives a mixture of water and oils from any suitable source 18 (FIG. 1). One common source 18 of the oil and water mixture would be the wash water from an industrial washer.

Still referring to FIGS. 1 and 2, a vertically elongated and generally rectangular pump housing 20 is positioned along one side 14 of the receiving tank 12. As best shown in FIG. 2, the pump housing 20 includes a portion which extends upwardly from the receiving tank 12 while the lower end of the pump housing 20 is positioned adjacent the bottom of the receiving tank 12. A rectangular opening 22 (FIG. 5) in the pump housing 20 permits fluid communication between the reservoir 16 and a pump chamber 24 formed by the pump housing 20. The fluid flow between the reservoir 12 and the pump chamber 24 will be subsequently described in greater detail.

Still referring to FIGS. 1 and 2, a conventional settling tank 26 is positioned adjacent the reservoir 12. In a fashion which will be subsequently described in greater detail, fluid from the pump chamber 24 is pumped through a conduit 28 into the settling tank 26. Since oils have a lower density than water, they float to the surface of the water in the settling tank in the well known fashion. The settling tank 26 is sized to permit sufficient time for this settling to occur. As shown in FIG. 1, the settling tank 26 includes a baffle 30 which divides the settling tank 26 into two chambers 32 and 34. This baffle 30 keeps the oils within the chamber 34 while allowing the clean water to flow into the chamber 32. A spigot 36 on the settling tank 26 is open adjacent the top of the settling tank chamber 34 and allows the separated oils to be drained from the settling tank 26. Conversely, a pipe assembly 38 extends between the settling tank chamber 32 and the reservoir 12 so that a portion of the clean water is returned from the settling tank 26 to the reservoir 12. The remainder of the cleaned water is returned through a conduit 94 to the industrial washer for reuse.

With reference to FIGS. 3 and 4, a means for pumping the water and oil mix from the pump chamber 24 up through the conduit 28 to the settling tank 26 is thereshown in greater detail and comprises a venturi pump means 40. The venturi pump means 40 includes an elongated tube 42 having an open lower end 44 positioned adjacent the bottom of the pump chamber 24. Conversely, the upper end 46 of the tube 44 is fluidly connected to the conduit 28 leading to the settling tank 26. Consequently, fluid flow upwardly through the tube 42 flows directly into the settling tank 26.

In order to force or pump the water and oil mixture up through the tube 42, a water jet 50 is positioned in alignment and spaced slightly downwardly from the bottom 44 of the tube 42. Consequently, the effluent from the water jet 50 flows upwardly through the tube 42 and, in doing so, inducts water and oil mix contained within the pump chamber 24 up through the tube 42 to the settling tank 26.

As best shown in FIG. 3, the water jet 50 is fluidly connected by a conduit 52, valve 54 and filter 56 to a source 58 of pressurized water. In the preferred embodiment of the invention where the device 10 is used in conjunction with an industrial washer, the source 58 of pressurized water is the water pump for the industrial washer. In the well known fashion, the filter 56 removes any debris which can be contained within the water to prevent clogging of the water jet 50 while the valve 54 allows adjustment of the water pressure.

With reference now to FIG. 3, preferably an aerator tube 60 had its upper end open above the liquid level in the pump chamber 24 and its lower end open to the space between the water jet 50 and the lower end 44 of the tube 42. In operation, the water jet 50 inducts air from the tube 60 and intermixes this air with the oil on water mixture flowing through the tube 42. The introduction of air into the mixture is found to decrease the settling time in the tank 26.

With reference now particularly to FIGS. 4 and 5, the device of the present invention includes an adjustable weir assembly 70 which skims an upper layer of liquid from the reservoir 12 and allows the skimmed portion to enter the pump chamber 24 for pumping to the settling tank 26. Since oils in the reservoir 12 levitate or float to the top of the liquid in the reservoir 12, the weir assembly 70 allows a mixture which is highly concentrated with hydrocarbon products to enter into the pump chamber which further enhances and decreases the settling time in the settling tank 26.

Still referring to FIGS. 4 and 5, the adjustable weir assembly 70 comprises a weir 72 having side panels 74 and a bottom panel 76. A channel section 78 having a cut out 80 (FIG. 5) extends between the side walls 74 of the weir 72. This cut out 80 forms a sluice 81 through which fluid flows from the reservoir 12 to the pump chamber 24.

The weir assembly 72 is pivotally mounted at 82 to the pump housing 20 so that the vertical heighth of the weir assembly 72 and thus of the channel 78 with its sluice 81, can vary. A pair of floats 84 secured to the weir 72 pivots the weir 72 in accordance with the liquid level in the reservoir 12 so that the depth of the sluice 81 with respect to the liquid level in the reservoir 12 remains substantially constant despite changes in the liquid level of the reservoir 12.

With reference now especially to FIG. 4, the weir assembly 72 includes a weight 90 which is adjustably mounted, as shown in phantom line, to an elongated rod 92. The weight 90 serves as a counterbalance for the weir assembly 72 so that adjustment of the weight 90 along the rod 92 adjusts the depth of the channel member 78, and thus of the sluice 81.

In operation, the position of the weight 90 is adjusted with respect to its rod 92 to provide the desired depth of the channel member 78 and sluice 81 in accordance with the particular application. Thereafter, the source or industrial washer 18 introduces the water and oil mix into the reservoir 16 in the previously described fashion.

At the same time, the water jet 50 is activated so that the water flow up through the venturi tube 42 inducts liquid from the pump chamber 24 up through the tube 42 and into the settling tank 26 in the desired fashion. Since the weir assembly 72 skims only the upper oil rich layer from the reservoir 16 into the pump chamber 24, the liquid pumped by the venturi pumping means 40 is highly concentrated in oils which advantageously decreases the required settling time in the settling tank 26.

During operation, a portion of the cleaned water from the settling tank 26 is returned through the conduit means 38 to the reservoir 12 in the previously described fashion. Additionally, a portion of the clean water is removed through the pipe 94 (FIG. 1) and is recycled to the industrial washer.

The flow rate of liquid from the pump chamber 24 to the settling tank 26 is controlled by the water pressure at the venturi jet 50. This water pressure is preferably periodically increased by opening a solenoid valve 98 (FIG. 3) which bypasses the valve 54 and increases the flow rate to the water jet 50. This increased flow rate causes cavitation within the pump chamber 24 and intermixes any accumulated scum, dirt, hydrocarbon products or the like which may have accumulated within the pump housing 20 in order to clean the pump housing 20.

Although the device of the present invention can be used to skim and separate hydrocarbon products from water in any sort of application, it has been found to be particularly desirable for use with industrial washers. In such an industrial washer, pressure is supplied to the water jet 50 at approximately 35 psi which induces a flow rate of 15 gallons per minute from the pump chamber 24 to the settling tank 26. In turn, the settling tank 26 is sufficiently large to allow 25 minutes to separate the hydrocarbon products from the water in the settling tank 26. Thereafter, the clean water is returned to the industrial washer.

Having described my invention, many modifications thereto will become apparent to those skilled in the art to which it pertains without deviating from the spirit of the invention as defined by the scope of the appended claims.

I claim:

1. A device for separating hydrocarbon products from a mixture of hydrocarbon products and water comprising:
   a receiving tank defining a reservoir means for receiving a mixture of water and hydrocarbon products, said hydrocarbon products forming an upper layer of said mixture in said receiving tank, said mixture having a top surface establishing a liquid level when said mixture is in said receiving tank,
   a settling tank,
   means for skimming said upper layer of said mixture in said receiving tank into a pumping chamber,
   means for pumping the skimmed upper layer of said mixture in said pumping chamber to said settling tank, said pumping means comprising a venturi pump means, said means for skimming comprising,
   a weir operatively disposed between said receiving tank and said pumping chamber, said weir having a channel section extending below the liquid level which allows fluid flow from said receiving tank to said pumping chamber, and
   means for maintaining said channel section at a predetermined distance below the liquid level in said receiving tank so that said channel section is positioned at substantially a same predetermined distance beneath the liquid level in said receiving tank regardless of the amount of said mixture in said receiving tank.

2. The invention as defined in claim 1 wherein said venturi pump means comprises:
   an elongated and substantially vertically extending tube, said tube being open at a lower end to said pump chamber and open at its upper end to said settling tank,
   a water jet aligned with and spaced downwardly from said lower end of said tube so that effluent from said water jet enters said tube.

3. The invention as defined in claim 2 wherein said device is used in conjunction with an industrial washer having a spray pump and wherein a portion of the output from said spray pump is fluidly connected to said water jet.

4. The invention as defined in claim 2 and comprising a ventilation pipe positioned adjacent said tube in said pump housing.

5. The invention as defined in claim 1 and comprising means for adjusting said predetermined distance of said channel section beneath the liquid level of said receiving tank.

6. The invention as defined in claim 5 wherein said means for adjusting the predetermined distance comprises a weight adjustably connected to said weir.

7. The invention as defined in claim 1 wherein said means for maintaining said channel section a predetermined distance below the liquid level in said receiving tank comprises a float means attached to said weir.

8. The invention as defined in claim 7 wherein said float means comprises a pair of floats attached to said weir on opposite sides of said channel section.

9. The invention as defined in claim 7 and comprising a pump housing surrounding said pump chamber.

10. The invention as defined in claim 9 wherein said weir is pivotally attached to said pump housing.

11. A device for separating hydrocarbon products from a mixture of hydrocarbon products and water comprising:
    a receiving tank defining a reservoir means for receiving a mixture of water and hydrocarbon products, said hydrocarbon products forming an upper layer of said mixture in said receiving tank, said mixture having a top surface establishing a liquid level when said mixture is in said receiving tank,
    a settling tank,
    means for skimming said upper layer of said mixture in said receiving tank into a pumping chamber,
    means for pumping the skimmed upper layer of said mixture in said pumping chamber to said settling tank, said pumping means comprising an elongated tube and a water jet, said tube extending substantially vertically, said tube being open at a lower end to said pump chamber and open at its upper end to said settling tank, said water jet being mounted in said pumping chamber and spaced downwardly from said lower end of said tube, said water jet aligned to direct effluent from said water jet through said mixture in said pumping chamber into said tube whereby said mixture is drawn into said tube with said effluent for delivery to said settling tank.

12. The invention as defined in claim 11 wherein said device is used in conjunction with an industrial washer having a spray pump and wherein a portion of the output from said spray pump is fluidly connected to said water jet.

13. The new invention as defined in claim 11 wherein said skimming means comprises:
    a weir operatively disposed between said receiving tank and said pumping chamber, said weir having a channel section extending below the liquid tank which allows fluid flow from said receiving tank to said pumping chamber,
    means for maintaining said channel section at a predetermined distance below the liquid level in said receiving tank so that said channel section is positioned at substantially a same predetermined distance beneath the liquid level in said receiving tank regardless of the amount of said mixture in said receiving tank.

14. The invention as defined in claim 13 and comprising means for adjusting said predetermined distance of said channel section beneath the liquid level of said receiving tank.

15. The invention as defined in claim 14 wherein said means for adjusting the predetermined distance comprises a weight adjustably connected to said weir.

* * * * *